United States Patent
Kim

(10) Patent No.: US 12,496,892 B2
(45) Date of Patent: Dec. 16, 2025

(54) HYDRAULIC MOUNT FOR VEHICLE

(71) Applicants: Hyundai Motor Company, Seoul (KR); Kia Corporation, Seoul (KR)

(72) Inventor: Seung Won Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 519 days.

(21) Appl. No.: 17/988,548

(22) Filed: Nov. 16, 2022

(65) Prior Publication Data

US 2023/0173906 A1      Jun. 8, 2023

(30) Foreign Application Priority Data

Dec. 6, 2021 (KR) ................. 10-2021-0172795

(51) Int. Cl.
*B60K 5/12* (2006.01)

(52) U.S. Cl.
CPC .................. *B60K 5/1208* (2013.01)

(58) Field of Classification Search
CPC ............ B60K 5/1208; F16F 13/1463
USPC ............. 267/140.13, 140.12, 140.5, 293
See application file for complete search history.

(56) References Cited

U.S. PATENT DOCUMENTS

| | | | | |
|---|---|---|---|---|
| 4,872,651 A | * | 10/1989 | Thorn | F16F 13/14 267/293 |
| 2007/0246870 A1 | * | 10/2007 | Siemer | F16C 32/06 267/140.12 |
| 2012/0098176 A1 | * | 4/2012 | Matsushita | F16F 13/1481 267/140.13 |
| 2015/0192189 A1 | * | 7/2015 | Hermann | F16F 13/1481 267/140.13 |
| 2015/0211597 A1 | * | 7/2015 | Kadowaki | F16F 13/1463 267/140.13 |
| 2015/0226285 A1 | * | 8/2015 | Schnaars | F16F 13/10 267/140.13 |

FOREIGN PATENT DOCUMENTS

| | | | | |
|---|---|---|---|---|
| KR | 2014-0026066 A | | 3/2014 | |
| KR | 20170114671 A | * | 10/2017 | .............. F16F 15/08 |
| KR | 20200050550 A | * | 5/2020 | ........... B60K 5/1291 |

* cited by examiner

*Primary Examiner* — Robert A. Siconolfi
*Assistant Examiner* — San M Aung
(74) *Attorney, Agent, or Firm* — Morgan Lewis & Bockius LLP

(57) ABSTRACT

A hydraulic mount capable of damping both an up-down vibration and a front-rear vibration of a motor module includes an internal pipe; a main rubber formed on an external circumferential surface of the internal pipe, and provided with a plurality of liquid chambers in which fluid is sealed; an orifice unit mounted to an external circumferential surface of the main rubber to cover the plurality of liquid chambers; and an external pipe surrounding and mounted on the orifice unit, and the orifice unit includes a first flow path connecting an upper liquid chamber and a lower liquid chamber among the plurality of liquid chambers provided in the main rubber in a fluidable manner; and a second flow path connecting a front liquid chamber and a rear liquid chamber among the plurality of liquid chambers provided in the main rubber in a fluidable manner.

14 Claims, 5 Drawing Sheets

HYDRAULIC MOUNT FOR VEHICLE

CROSS-REFERENCE TO RELATED APPLICATION

The present application claims priority to Korean Patent Application No. 10-2021-0172795 filed on Dec. 6, 2021, the entire contents of which is incorporated herein for all purposes by this reference.

BACKGROUND OF THE PRESENT DISCLOSURE

Field of the Present Disclosure

The present disclosure relates to a hydraulic mount for a vehicle, and specifically, to a hydraulic mount with increased damping performance to an up-down vibration and a front-rear vibration.

Description of Related Art

Recently, research and development of electric vehicles, which are eco-friendly vehicles, are being actively conducted. The electric vehicles are driven by a motor instead of an engine, and the motor is powered by a rechargeable battery.

In the electric vehicles, a bush-type rubber mount is generally used instead of a hydraulic mount because a weight of a motor module including the motor and power electronics (PE) is smaller than a weight of the existing engine.

However, it is true that the bush-type rubber mount has very low axial characteristics due to the limitation of its shape. Accordingly, when locations of the rubber mounts are determined to mount the motor module on a vehicle body, the rubber mounts are designed to be displaced from each other with respect to the respective axial directions.

However, there is a problem in that when the motor module is mounted on a vehicle by a three-point mount method, the rubber mount disposed at the front has no choice but to be disadvantageous in damping the behavior of the motor module, so that the motor module behaves largely, intensifying the sense of aftershock.

Furthermore, while in general gasoline vehicles, an up-down behavior mainly occurs at the front of a vehicle equipped with an engine when a vehicle travels, whereas in electric vehicles, the motor module is mounted on both front and rear wheels, and both an up-down behavior and a front-rear behavior of the motor module occurs when a vehicle travels on uneven roads, so that it is vulnerable to both the up-down vibration and the front-rear vibration.

The information included in this Background of the present disclosure is only for enhancement of understanding of the general background of the present disclosure and may not be taken as an acknowledgment or any form of suggestion that this information forms the prior art already known to a person skilled in the art.

BRIEF SUMMARY

Various aspects of the present disclosure are directed to providing a hydraulic mount for a vehicle, which may be configured in a structure configured for damping in both directions with respect to a radial direction, damping both an up-down behavior and a front-rear behavior of a motor module.

An object of the present disclosure is not limited to the above-mentioned object, and other objects of the present disclosure not mentioned will be clearly understood by those skilled in the art to which the present disclosure pertains from the following description.

there is provided a hydraulic mount for a vehicle according to an exemplary embodiment of the present disclosure including: an internal pipe; a main rubber formed on an external circumferential surface of the internal pipe, and provided with a plurality of liquid chambers in which fluid is sealed; an orifice unit mounted to an external circumferential surface of the main rubber to cover the plurality of liquid chambers; and an external pipe surrounding and mounted on the orifice unit, wherein the orifice unit includes a first flow path connecting an upper liquid chamber and a lower liquid chamber among the plurality of liquid chambers provided in the main rubber in a fluidable manner; and a second flow path connecting a front liquid chamber and a rear liquid chamber among the plurality of liquid chambers provided in the main rubber in a fluidable manner.

According to an exemplary embodiment of the present disclosure, the upper liquid chamber is formed to be recessed at an upper side of the external circumferential surface of the main rubber, the lower liquid chamber is formed to be recessed at a lower side of the external circumferential surface of the main rubber, the front liquid chamber is formed to be recessed at a front portion of the external circumferential surface of the main rubber, and the rear liquid chamber is formed to be recessed at a rear portion of the external circumferential surface of the main rubber.

Furthermore, the upper liquid chamber is disposed opposite to the lower liquid chamber with respect to the internal pipe, and the front liquid chamber is disposed opposite to the rear liquid chamber with respect to the internal pipe.

Furthermore, the first flow path is formed to be recessed on an external circumferential surface of the orifice unit, and first and second end portions of the first flow path are connected to the upper liquid chamber and the lower liquid chamber through an upper opening and a lower opening perforated in the orifice unit in a fluidable manner, respectively.

Furthermore, the upper opening is formed in the orifice unit to be directly adjacent to the upper liquid chamber, and the lower opening is formed in the orifice unit to be directly adjacent to the lower liquid chamber.

Furthermore, the second flow path is formed to be recessed on an external circumferential surface of the orifice unit, and first and second end portions of the second flow path are connected to the front liquid chamber and the rear liquid chamber through a front opening and a rear opening perforated in the orifice unit in a fluidable manner, respectively.

Furthermore, the front opening is formed in the orifice unit to be directly adjacent to the front liquid chamber, and the rear opening is formed in the orifice unit to be directly adjacent to the rear liquid chamber.

Furthermore, the first flow path and the second flow path are disposed to be spaced from each other in an axial direction of the orifice unit.

Furthermore, the internal pipe is disposed to extend in a lateral direction of the vehicle.

Through the above configuration, the hydraulic mount according to an exemplary embodiment of the present disclosure provides the following effects.

First, it is possible to damp the longitudinal behavior and the vertical behavior of the motor module when a vehicle travels, improving the sense of aftershock when a vehicle travels on the uneven road, and the traveling vibration when a vehicle travels at a high speed.

Second, the hydraulic mount can be applied regardless of the direction assembled to the vehicle body, and configured in a simple structure, minimizing the occurrence of failure.

Third, when the hydraulic mount is applied to the subframe mounted on the vehicle body, it is possible to not only improve the longitudinal impact but also improve the lateral acceleration, improving the traveling performance of a vehicle.

The effects of the present disclosure are not limited to the above-mentioned effects, and other effects of the present disclosure not mentioned will be clearly understood by those skilled in the art to which the present disclosure pertains from the following description.

It is understood that the term "automotive" or "vehicular" or other similar term as used herein is inclusive of motor automotives in general such as passenger automobiles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels derived from resources other than petroleum). As referred to herein, a hybrid automotive is an automotive that has two or more sources of power, for example both gasoline-powered and electric-powered automotives.

The above and other features of the present disclosure are discussed infra.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
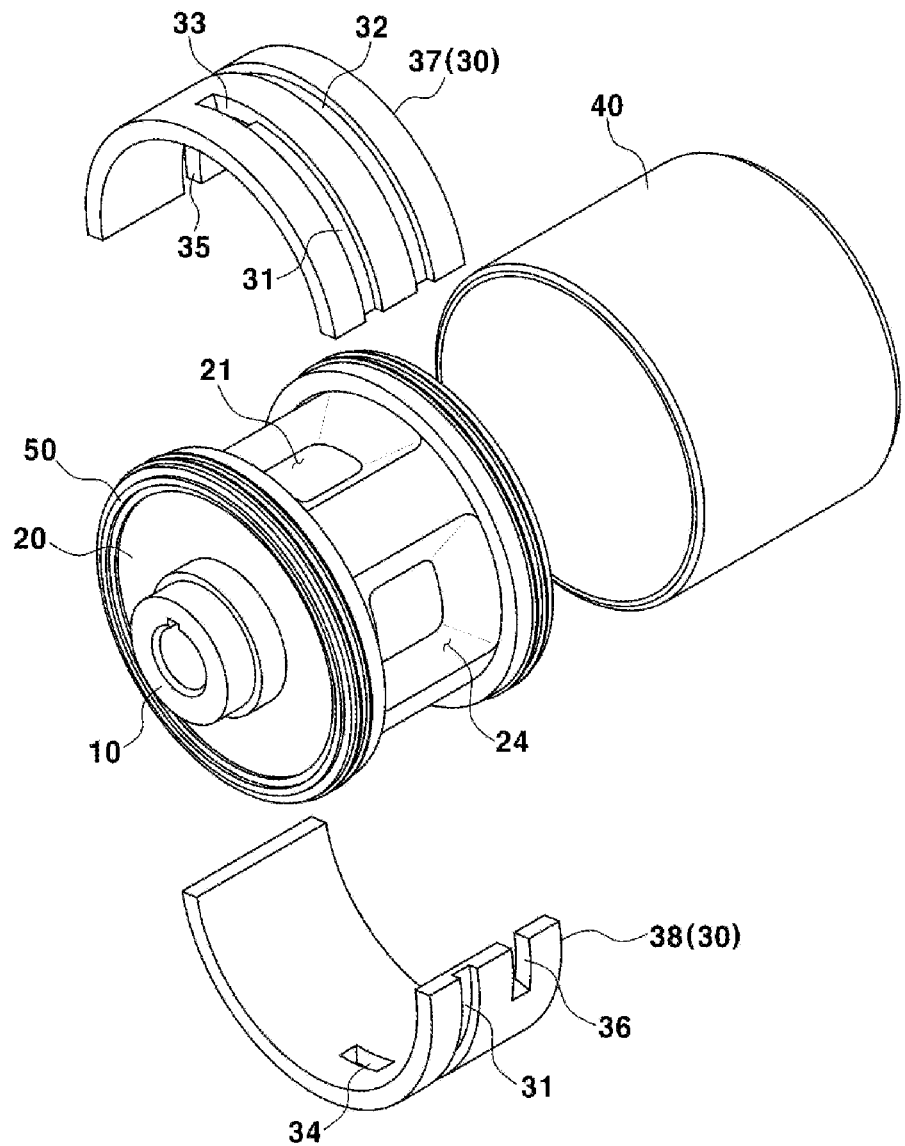
FIG. 1 shows a state before a hydraulic mount according to an exemplary embodiment of the present disclosure is assembled.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Specific structural or functional descriptions presented in the exemplary embodiments of the present disclosure are only exemplified for describing the embodiments according to the concept of the present disclosure, and the embodiments according to the concept of the present disclosure may be conducted in various forms.

Furthermore, throughout the present specification, when a portion "includes" a certain component, it means that other components may be further included, other than excluding other components, unless specially stated otherwise.

Furthermore, in the present specification, directions such as "forward", "rearward", "upward", and "downward" are based on a vehicle unless otherwise specified. Furthermore, in the present specification, a "longitudinal direction" means a direction extending in a front-rear direction of a vehicle, a "vertical direction" means a direction extending in an up-down direction of a vehicle, and a "lateral direction" means a direction extending in a left and right direction of a vehicle.

Furthermore, in the present specification, the classification of the names of the components into "first", "second", etc. is only to distinguish the components having the same name, and does not limit the functions or orders of the components.

Hereinafter, various embodiments of the present disclosure will be described with reference to the accompanying drawings. Matters expressed in the accompanying drawings may be different from the forms actually implemented as the schematic drawings for easy explanation of the embodiments of the present disclosure.

Figure 7:
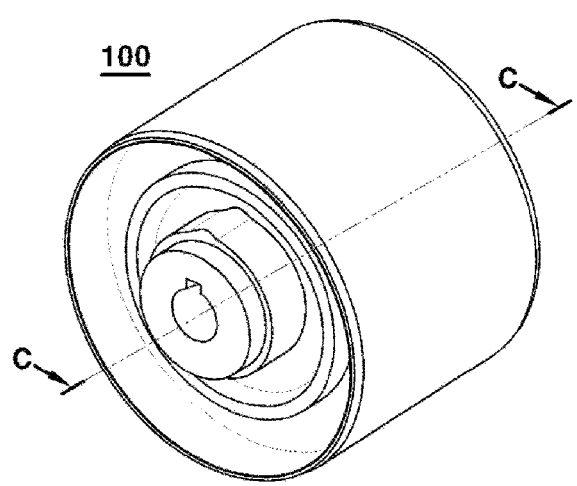
FIG. 7 shows a conventional bush-type rubber mount.
Figure 8:
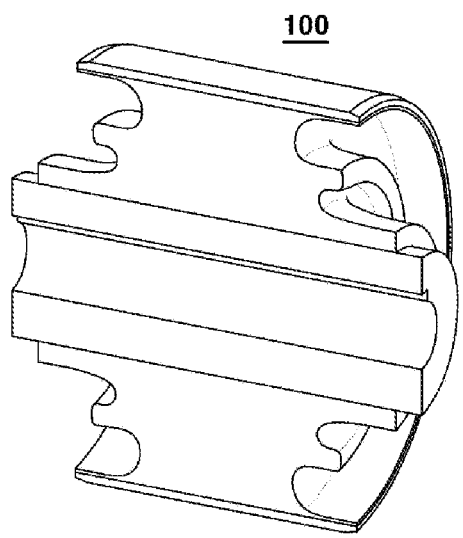
FIG. 8 shows a rubber mount viewed from C-C in FIG. 7.

FIG. 7 and FIG. 8 are views showing a conventional bush-type rubber mount.

A motor module includes a motor configured to generate traveling power of an electric vehicle, and power electronics (PE) configured to supply power to the motor.

The motor module is generally mounted to a vehicle body through a bush-type rubber mount 100 as shown in FIGS. 7 and 8. A rear motor module mounted on a rear wheel side is mounted on the vehicle body through a rear subframe.

When the rear motor module is mounted on the vehicle body by a three-point support method, a front central portion, a rear left portion, and a rear right portion of the rear motor module are coupled to the rear subframe through the rubber mount 100, and the rear subframe is also mounted on the vehicle body by a four-point support method through the bush-type rubber mount.

At the present time, the rubber mount mounted on the front central portion of the motor module has a central axis disposed to extend in a longitudinal direction of a vehicle, and the rubber mount mounted on the rear left portion and rear right portion of the motor module has a central axis disposed to extend in a lateral direction of a vehicle. Furthermore, the rubber mount for the rear subframe has a central axis disposed to extend in a vertical direction of a vehicle.

The electric vehicle is vulnerable to both vertical and longitudinal vibrations because the motor modules are mounted on both front and rear wheels, and both the vertical and longitudinal behaviors of the motor module occur when a vehicle travel.

Furthermore, since the bush-type rubber mount generally has axial damping performance lower than radial damping performance, longitudinal damping performance of the rubber mount mounted on the front central portion of the motor module and vertical damping performance of the rubber mount for the rear subframe are relatively insufficient, and as a result, there is a problem in that the longitudinal and vertical vibrations of a vehicle become severe.

Accordingly, in order to improve the behavior of the motor module when a vehicle travels, it is necessary to replace the rubber mounts mounted on the rear left portion and rear right portion of the motor module with mounts having high damping performance against the longitudinal and vertical vibrations.

In other words, a mount configured for damping both the vertical and longitudinal behaviors of the motor module is required.

Accordingly, the present disclosure provides a hydraulic-sealed mount (i.e., hydraulic mount) provided with a two-way damping structure in a radial direction thereof. The hydraulic mount is configured in a structure in which damping performance for the longitudinal and vertical vibrations of a vehicle is increased.

The hydraulic mount is configured in a structure in which damping performance against a vibration in a direction supporting a load of the motor module (i.e., vertical direction of a vehicle) and a vibration in a radial direction (i.e., longitudinal direction of a vehicle) perpendicular to the vertical direction is increased, so that it is possible to effectively damp both the vertical and longitudinal vibrations according to the behavior of the motor module.

Figure 2:
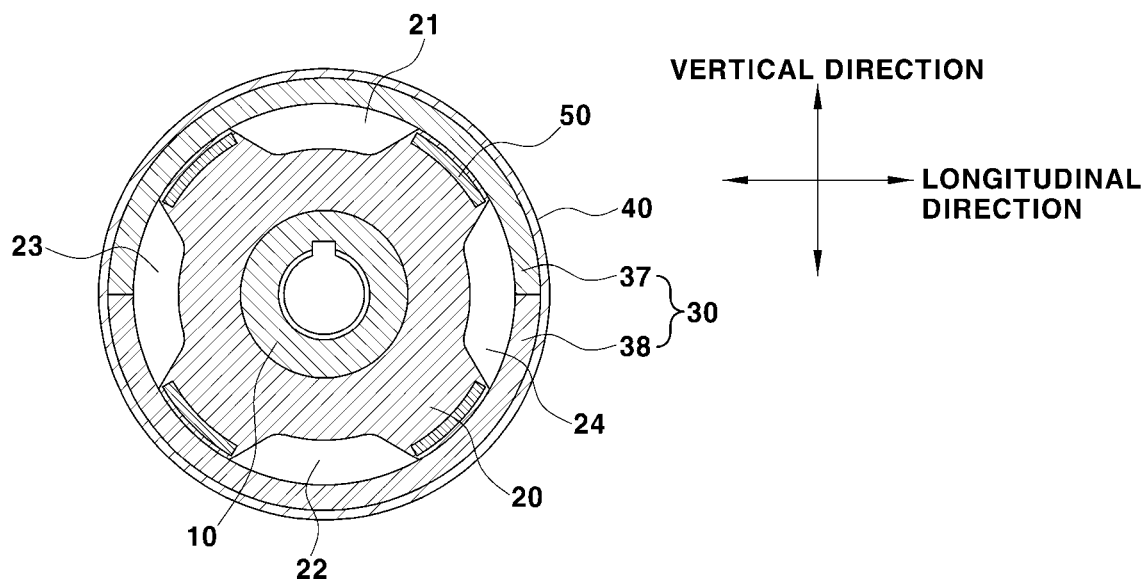
FIG. 2 shows a state in which the hydraulic mount is assembled viewed from one side.
Figure 3:
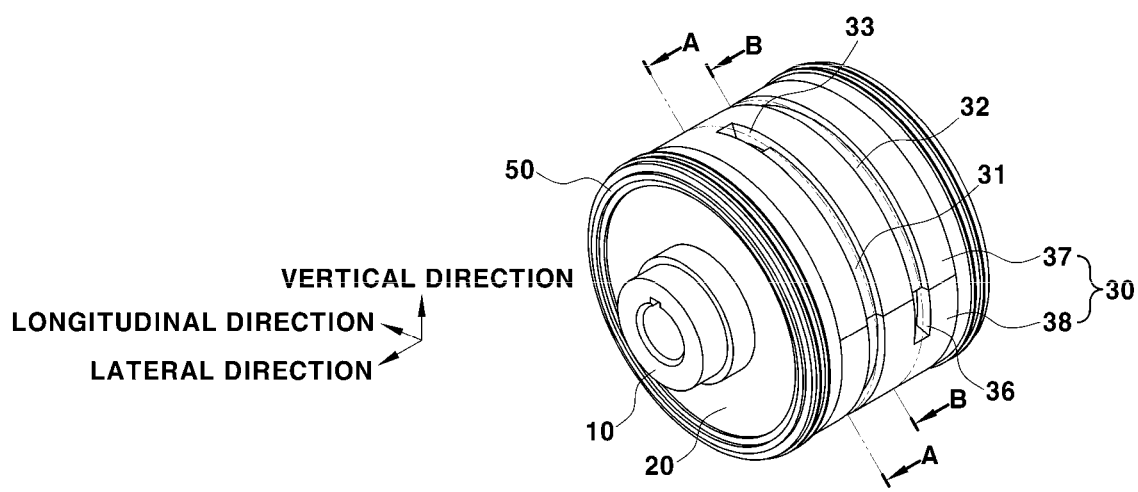
FIG. 3 shows the hydraulic mount from which an external pipe is omitted.
Figure 4:
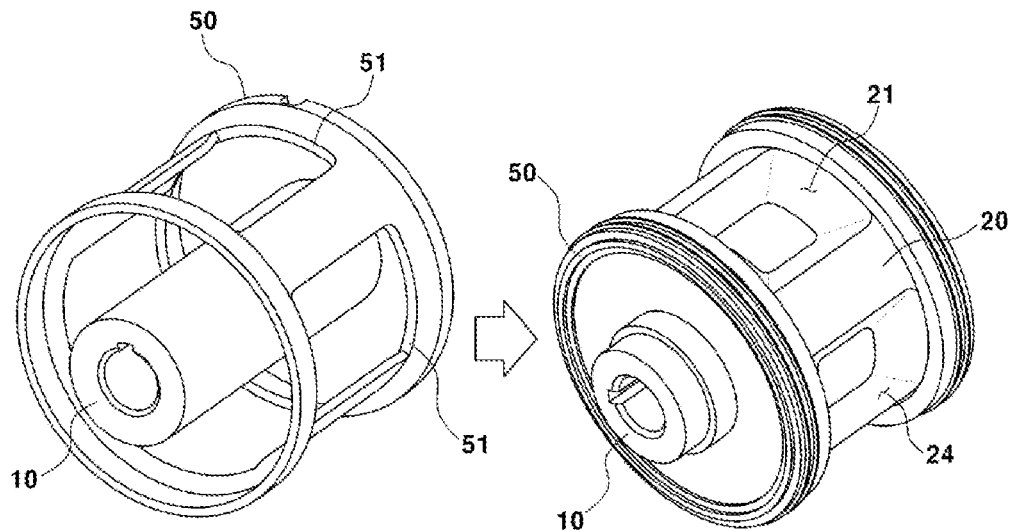
FIG. 4 shows a part of a process of manufacturing the hydraulic mount.
Figure 5:
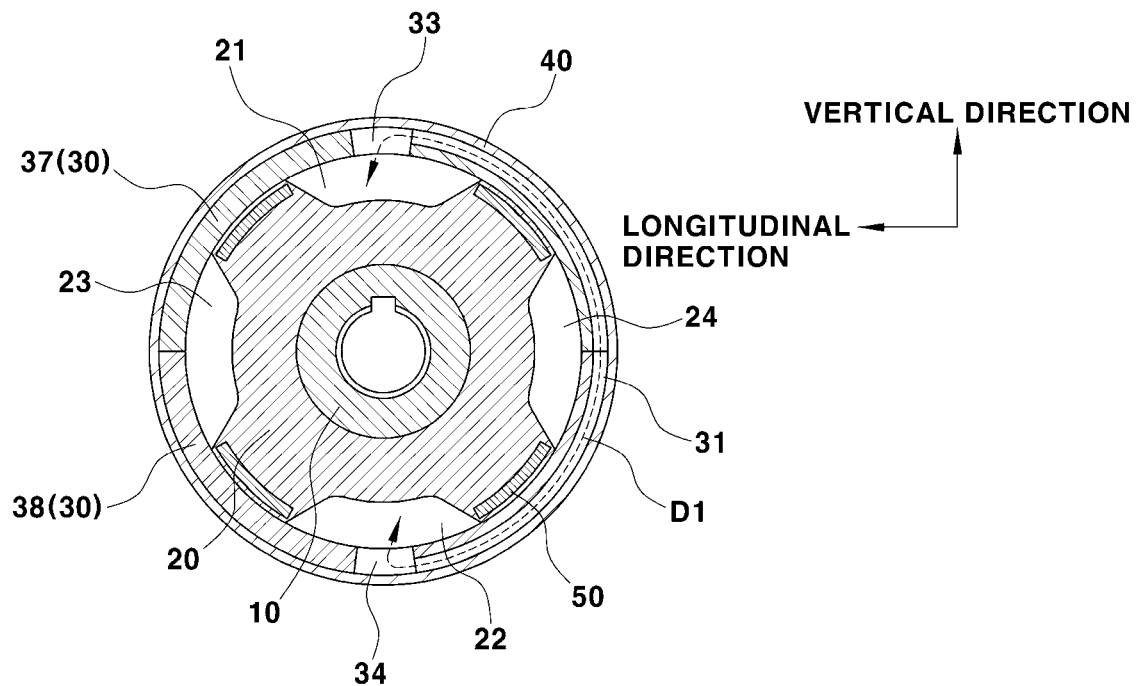
FIG. 5 shows the hydraulic mount viewed from A-A in FIG. 3.
Figure 6:
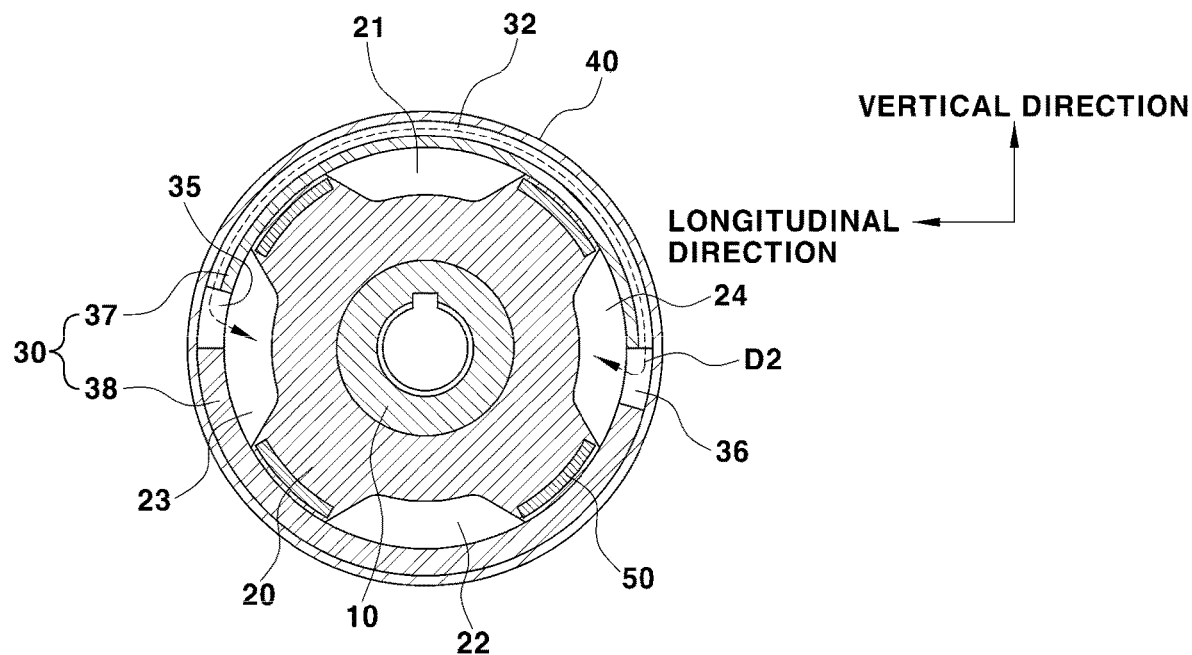
FIG. 6 shows the hydraulic mount viewed from B-B in FIG. 3.

FIG. 1 shows a state before a hydraulic mount according to an exemplary embodiment of the present disclosure is assembled, FIG. 2 shows a state in which the hydraulic mount is assembled viewed from one side, FIG. 3 shows the hydraulic mount from which an external pipe is omitted, FIG. 4 shows a part of a process of manufacturing the hydraulic mount, FIG. 5 shows the hydraulic mount viewed from A-A in FIG. 3, and FIG. 6 shows the hydraulic mount viewed from B-B in FIG. 3. Furthermore, FIG. 5 and FIG. 6 show the hydraulic mount without omitting the external pipe.

As shown in FIG. 1, FIG. 2, and FIG. 3, the hydraulic mount according to an exemplary embodiment of the present disclosure includes an internal pipe 10, a main rubber 20, an orifice unit 30, and an external pipe 40.

The internal pipe 10 is coupled to a drive part mounted on the vehicle body. For example, the internal pipe 10 is coupled to a motor module of an electric vehicle. The internal pipe 10 may be coupled to the motor module through a fastening member such as a bolt. At the instant time, the internal pipe 10 may have a central axis disposed to extend in a lateral direction of a vehicle.

The internal pipe 10 may transmit vibration input from the motor module to the main rubber 20. The internal pipe 10 may have a hollow cylindrical shape, and may be made of a metallic material.

The main rubber 20 is formed and disposed on an external circumferential surface of the internal pipe 10. For example, the main rubber 20 is vulcanized and disposed on the external circumferential surface of the internal pipe 10.

As shown in FIG. 4, the main rubber 20 may be vulcanized at an outside of a middle pipe 50 coaxially disposed with the internal pipe 10. At the instant time, the middle pipe 50 may be surrounded by the main rubber 20, and made of a metallic material.

Furthermore, the middle pipe 50 is configured in a cylindrical shape provided with a plurality of openings 51 in order to secure a space in which the liquid chambers 21, 22, 23, 24 of the main rubber 20 are disposed.

The main rubber 20 is formed between the internal pipe 10 and the middle pipe 50 in a non-hollow form, that is, a solid form in which the inside is completely filled. The main rubber 20 is molded at the outside of the middle pipe 50, improving durability.

As shown in FIG. 1 and FIG. 2, the main rubber 20 is provided with the plurality of liquid chambers 21, 22, 23, 24 spaced from each other in a circumferential direction thereof. Specifically, the main rubber 20 is provided with an upper liquid chamber 21, a lower liquid chamber 22, a front liquid chamber 23, and a rear liquid chamber 24.

The upper liquid chamber 21 is formed in a recessed shape at an upper side of an external circumferential surface of the main rubber 20, and the lower liquid chamber 22 is formed in a recessed shape at a lower side of the external circumferential surface of the main rubber 20. At the instant time, the upper liquid chamber 21 is disposed opposite to the lower liquid chamber 22 with respect to the internal pipe 10. Furthermore, the upper liquid chamber 21 and the lower liquid chamber 22 may be formed to be symmetrical with each other with respect to the internal pipe 10.

The front liquid chamber 23 is formed in a recessed shape at a front portion of the external circumferential surface of the main rubber 20, and the rear liquid chamber 24 is formed in a recessed shape at a rear portion of the external circumferential surface of the main rubber 20. At the instant time, the front liquid chamber 23 is disposed opposite to the rear liquid chamber 24 with respect to the internal pipe 10. Furthermore, the front liquid chamber 23 and the rear liquid chamber 24 may be formed to be symmetrical with each other with respect to the internal pipe 10. Furthermore, the front liquid chamber 23 and the rear liquid chamber 24 are disposed between the upper liquid chamber 21 and the lower liquid chamber 22.

Furthermore, the main rubber 20 may be formed in a stepped structure in order to provide a space in which the orifice unit 30 is assembled. Specifically, the main rubber 20 may be formed in a stepped structure so that both end portions in an axial direction protrude outward more than a central portion in the axial direction. The liquid chambers 21, 22, 23, 24 are disposed at the central portion of the main rubber 20 in the axial direction.

The orifice unit 30 is configured to airtightly cover the liquid chambers 21, 22, 23, 24 of the main rubber 20. The orifice unit 30 is assembled on the external circumferential surface of the main rubber 20 to airtightly close the liquid chambers 21, 22, 23, 24. The orifice unit 30 is assembled and disposed at the central portion of the main rubber 20 in the axial direction.

The orifice unit 30 is provided with a first flow path 31 and a second flow path 32 for fluid movement between the liquid chambers 21, 22, 23, 24.

The first flow path 31 fluidically connects the upper liquid chamber 21 and the lower liquid chamber 22 among the liquid chambers 21, 22, 23, 24 provided in the main rubber 20, and the second flow path 32 fluidically connects the front liquid chamber 23 and the rear liquid chamber 24 among the liquid chambers 21, 22, 23, 24 provided in the main rubber 20.

To the present end, as shown in FIGS. 3 and 5, the first flow path 31 is formed to be recessed on the external circumferential surface of the orifice unit 30, and at the instant time, both end portions of the first flow path 31 are connected to the upper liquid chamber 21 and the lower liquid chamber 22 through the upper opening 33 and the lower opening 34 perforated in the orifice unit 30 in a fluidable manner, respectively.

In other words, a first end portion of the first flow path 31 in the longitudinal direction is connected to the upper liquid chamber 21 through the upper opening 33 in a fluidable manner, and the second end portion of the first flow path 31 in the longitudinal direction is connected to the lower liquid chamber 22 through the lower opening 34 in a fluidable manner. At the instant time, the first flow path 31 is formed to extend from the orifice unit 30 in the circumferential direction to connect the upper opening 33 and the lower opening 34.

The upper opening 33 is formed in the orifice unit 30 to be directly adjacent to the upper liquid chamber 21, and the lower opening 34 is formed in the orifice unit 30 to be directly adjacent to the lower liquid chamber 22.

Furthermore, as shown in FIGS. 3 and 6, the second flow path 32 is formed in a recessed shape on an external circumferential surface of the orifice unit 30, and at the instant time, both end portions of the second flow path 32 are connected to the front liquid chamber 23 and the rear liquid chamber 24 through the front opening 35 and the rear opening 36 perforated in the orifice unit 35 in a fluidable manner, respectively.

In other words, a first end portion of the second flow path 32 in the longitudinal direction is connected to the front liquid chamber 23 through the front opening 35 in a fluidable manner, and a second end portion of the second flow path 32 in the longitudinal direction is connected to the rear liquid chamber 24 through the rear opening 36 in a fluidable manner. At the instant time, the second flow path 32 is formed to extend from the orifice unit 30 in the circumferential direction to connect the front opening 35 and the rear opening 36.

The front opening 35 is formed in the orifice unit 30 to be directly adjacent to the front liquid chamber 23, and the rear opening 36 is formed in the orifice unit 30 to be directly adjacent to the rear liquid chamber 24.

Here, both end portions of the first flow path 31 are both end portions in the longitudinal direction thereof, and both end portions of the orifice unit 30 in the circumferential direction, and both end portions of the second flow path 32 are both end portions in the longitudinal direction thereof, and both end portions of the orifice unit 30 in the circumferential direction.

Furthermore, the first flow path 31 and the second flow path 32 are disposed to be spaced from each other in the axial direction of the orifice unit 30. When the hydraulic mount according to an exemplary embodiment of the present disclosure is mounted on the vehicle body, the first flow path 31 and the second flow path 32 may be disposed to be spaced from each other in the lateral direction of a vehicle.

The first flow path 31 and the second flow path 32 are disposed at a distance so that they do not interfere with each other, so that the fluid independently moves between the upper liquid chamber 21 and the lower liquid chamber 22.

The orifice unit 30 may be configured to be divided into an upper orifice 37 and a lower orifice 38 to be assembled to the external circumferential surface of the main rubber 20.

As shown in FIGS. 1 and 3, the upper orifice 37 and the lower orifice 38 may be formed in a semi-cylindrical shape, and assembled and disposed on the external circumferential surface of the main rubber 20. At the instant time, both end portions of the upper orifice 37 and both end portions of the lower orifice 38 are connected to come into airtight contact with each other. Here, both end portions of the upper orifice 37 and both end portions of the lower orifice 38 are both end portions in the circumferential direction thereof.

Furthermore, referring to FIG. 5, the upper opening 33 is formed at a central portion of the upper orifice 37 in the circumferential direction, the lower opening 34 is formed at a central portion of the lower orifice 38 in the circumferential direction, and the first flow path 31 is formed to be recessed in the external circumferential surface of the upper orifice 37 and the external circumferential surface of the lower orifice 38 to connect the upper opening 33 and the lower opening 34. At the instant time, the upper opening 33 is disposed opposite to the lower opening 34 with respect to the internal pipe 10.

Furthermore, referring to FIG. 6, the front opening 35 is formed at the end portion of the upper orifice 37 in the circumferential direction, the rear opening 36 is formed at the end portion of the lower orifice 38 in the circumferential direction, and the second flow path 32 is formed in a recessed shape on the external circumferential surface of the upper orifice 37 to connect the front opening 35 and the rear opening 36. At the instant time, the front opening 35 is disposed opposite to the rear opening 36 with respect to the internal pipe 10. Furthermore, with respect to the circumferential direction of the orifice unit 30, the front opening 35 is disposed between the upper opening 33 and the lower opening 34, and the rear opening 36 is also disposed between the upper opening 33 and the lower opening 34.

Meanwhile, the external pipe 40 is configured to airtightly surround the orifice unit 30 assembled to the external circumferential surface of the main rubber 20. In other words, the external pipe 40 is configured in a cylindrical shape that airtightly surrounds the upper orifice 37 and the lower orifice 38 disposed on the external circumferential surface of the main rubber 20.

The external pipe 40 is forcibly assembled to the main rubber 20 and the outside of the orifice unit 30 in a press-fit manner. At the instant time, the external pipe 40 surrounds the external circumferential surface of the main rubber 20 and the external circumferential surface of the orifice unit 30 as a whole.

The main rubber 20 has the end portion in the axial direction coming into close contact with an internal circumferential surface of the external pipe 40, and the orifice unit 30 has the external circumferential surface coming into close contact with the internal circumferential surface of the external pipe 40 as a whole.

Furthermore, in order to seal the fluid in each of the liquid chambers 21, 22, 23, 24 of the main rubber 20, the orifice unit 30 and the external pipe 40 are assembled to the main rubber 20 in the liquid. In other words, the orifice unit 30 and the external pipe 40 are assembled to the main rubber 20 in a state of being immersed in the fluid. The fluid moves between the liquid chambers 21, 22, 23, 24 through the first flow path 31 and the second flow path 32 to damp the vibrations transmitted through the internal pipe 10. The fluid may damp vibrations along with the main rubber 20.

The external pipe 40 is assembled to the outside of the orifice unit 30 and then swagged. The external pipe 40 is coupled to the vehicle body, for example, may be coupled to the vehicle body through a mount bracket and the like mounted at one side of the vehicle body.

Here, an operating principle of the hydraulic mount according to an exemplary embodiment of the present disclosure will be described with reference to FIG. 5 and FIG. 6.

When the vertical vibration is input to the internal pipe 10, as indicated by the arrow D1 in FIG. 5, the fluid moves between the upper liquid chamber 21 and the lower liquid chamber 22 through the first flow passage 31, so that the vertical vibration is damped.

In other words, when the vertical vibration of the internal pipe 10 occurs, the fluid in the upper liquid chamber 21 moves to the lower liquid chamber 22 through the first flow path 31, and the fluid in the lower liquid chamber 22 moves to the upper liquid chamber 21 through the first flow path 31, so that the vertical vibration of the internal pipe 10 is damped.

Furthermore, when the longitudinal vibration is input to the internal pipe 10, as indicated by the arrow D2 in FIG. 6, the fluid moves between the front liquid chamber 23 and the rear liquid chamber 24 through the second flow path 32, so that the longitudinal vibration is damped.

In other words, when the longitudinal vibration of the internal pipe 10 occurs, the fluid in the front liquid chamber 23 moves to the rear liquid chamber 24 through the second flow path 32, and the fluid in the rear liquid chamber 24 moves to the front liquid chamber 23 through the second flow path 32, so that the longitudinal vibration of the internal pipe 10 is damped.

Furthermore, the vibration of the internal pipe 10 is also damped by compression and restoration of the main rubber 20.

The hydraulic mount according to an exemplary embodiment of the present disclosure configured and operated as described above may be configured to enable the two-way damping in the radial direction thereof, obtaining the following effects.

First, it is possible to damp the longitudinal behavior and the vertical behavior of the motor module when a vehicle travels, improving the sense of aftershock when a vehicle travels on the uneven road, and the traveling vibration when a vehicle travels at a high speed.

Second, the hydraulic mount can be applied regardless of the direction assembled to the vehicle body, and configured in a simple structure, minimizing the occurrence of failure.

Third, when the hydraulic mount is applied to the subframe mounted on the vehicle body, it is possible to not only improve the longitudinal impact but also improve the lateral acceleration, improving the traveling performance of a vehicle.

In other words, when the hydraulic mount is applied to the subframe so that the internal pipe 10 is vertically disposed, it is possible to improve the longitudinal impact and lateral acceleration of a vehicle.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the present disclosure and their practical application, to enable others skilled in the art to make and utilize various exemplary embodiments of the present disclosure, as well as various alternatives and modifications thereof. It is intended that the scope of the present disclosure be defined by the claims appended hereto and their equivalents.

What is claimed is:

1. A hydraulic mount apparatus for a vehicle, the hydraulic mount apparatus comprising:
    an internal pipe;
    a main rubber formed on an external circumferential surface of the internal pipe, and provided with a plurality of liquid chambers in which fluid is sealed;
    an orifice unit mounted to an external circumferential surface of the main rubber to cover the plurality of liquid chambers including an upper liquid chamber, a lower liquid chamber, a front liquid chamber and a rear liquid chamber; and
    an external pipe surrounding and mounted on the orifice unit,
    wherein the orifice unit includes:
    a first flow path fluidically connecting the upper liquid chamber and the lower liquid chamber among the plurality of liquid chambers provided in the main rubber; and
    a second flow path fluidically connecting the front liquid chamber and the rear liquid chamber among the plurality of liquid chambers provided in the main rubber,
    wherein the first flow path and the second flow path is formed to be recessed on an external circumferential surface of the orifice unit,
    wherein the first flow path includes first end portions connected to the upper liquid chamber and second end portions connected to the lower liquid chamber,
    wherein the second flow path includes first end portions connected to the front liquid chamber and second end portions connected to the rear liquid chamber, and
    wherein the first flow path and the second flow path are separated from each other by being spaced from each other in an axial direction of the orifice unit.

2. The hydraulic mount apparatus of claim 1,
    wherein the upper liquid chamber is formed to be recessed at an upper side of the external circumferential surface of the main rubber, and the lower liquid chamber is formed to be recessed at a lower side of the external circumferential surface of the main rubber, and
    wherein the front liquid chamber is formed to be recessed at a front portion of the external circumferential surface of the main rubber, and the rear liquid chamber is formed to be recessed at a rear portion of the external circumferential surface of the main rubber.

3. The hydraulic mount apparatus of claim 1,
    wherein the upper liquid chamber is disposed opposite to the lower liquid chamber with respect to the internal pipe, and the front liquid chamber is disposed opposite to the rear liquid chamber with respect to the internal pipe.

4. The hydraulic mount apparatus of claim 1,
wherein first and second end portions of the first flow path are fluidically connected to the upper liquid chamber and the lower liquid chamber through an upper opening and a lower opening perforated in the orifice unit, respectively.

5. The hydraulic mount apparatus of claim 4,
wherein the upper opening is formed in the orifice unit to be directly adjacent to the upper liquid chamber, and the lower opening is formed in the orifice unit to be directly adjacent to the lower liquid chamber.

6. The hydraulic mount apparatus of claim 5,
wherein the orifice unit includes an upper orifice and a lower orifice, and
wherein the upper opening is formed at a central portion of the upper orifice and the lower opening is formed at a central portion of the lower orifice.

7. The hydraulic mount apparatus of claim 1,
wherein the first and second end portions of the second flow path are fluidically connected to the front liquid chamber and the rear liquid chamber through a front opening and a rear opening perforated in the orifice unit, respectively.

8. The hydraulic mount apparatus of claim 7,
wherein the front opening is formed in the orifice unit to be directly adjacent to the front liquid chamber, and the rear opening is formed in the orifice unit to be directly adjacent to the rear liquid chamber.

9. The hydraulic mount apparatus of claim 8,
wherein the orifice unit includes an upper orifice and a lower orifice, and
wherein the front opening is formed at an end portion of the upper orifice and the rear opening is formed at an end portion of the lower orifice, and the second flow path is formed in a recessed shape on the external circumferential surface of the upper orifice to connect the front opening and the rear opening.

10. The hydraulic mount apparatus of claim 1,
wherein the internal pipe is disposed to extend in a lateral direction of the vehicle.

11. The hydraulic mount apparatus of claim 1,
wherein the fluid moves between the liquid chambers of the main rubber through the first flow path and the second flow path to damp vibrations transmitted through the internal pipe with the main rubber.

12. The hydraulic mount apparatus of claim 1,
wherein the orifice unit and the external pipe are assembled to the main rubber in a state of being immersed in the fluid.

13. The hydraulic mount apparatus of claim 1, further includes a middle pipe surrounded by the main rubber.

14. The hydraulic mount apparatus of claim 13, wherein the middle pipe includes a plurality of openings to secure a space in which the liquid chambers of the main rubber are disposed.

* * * * *